United States Patent
Hayakawa et al.

(10) Patent No.: US 10,446,820 B2
(45) Date of Patent: Oct. 15, 2019

(54) ALKALINE BATTERY SEPARATOR

(71) Applicant: KURARAY CO., LTD., Kurashiki-shi (JP)

(72) Inventors: Tomohiro Hayakawa, Okayama (JP); Toshimichi Kusunoki, Okayama (JP); Hiroyuki Kawai, Okayama (JP); Koichi Kambe, Osaka (JP)

(73) Assignee: KURARAY CO., LTD., Kurashiki-shi (JP)

(*) Notice: Subject to any disclaimer, the term of this patent is extended or adjusted under 35 U.S.C. 154(b) by 0 days.

(21) Appl. No.: 15/759,627

(22) PCT Filed: Sep. 14, 2016

(86) PCT No.: PCT/JP2016/077104
§ 371 (c)(1),
(2) Date: Mar. 13, 2018

(87) PCT Pub. No.: WO2017/047638
PCT Pub. Date: Mar. 23, 2017

(65) Prior Publication Data
US 2018/0269450 A1    Sep. 20, 2018

(30) Foreign Application Priority Data

Sep. 15, 2015 (JP) ................. 2015-181745

(51) Int. Cl.
*H01M 2/16* (2006.01)
*H01M 10/24* (2006.01)

(52) U.S. Cl.
CPC ........... *H01M 2/1626* (2013.01); *H01M 2/16* (2013.01); *H01M 2/162* (2013.01); *H01M 2/1693* (2013.01); *H01M 10/24* (2013.01)

(58) Field of Classification Search
CPC .. H01M 2/1626; H01M 10/24; H01M 2/1693; H01M 2/162; H01M 2/16
See application file for complete search history.

(56) References Cited

U.S. PATENT DOCUMENTS 7,754,387 B2 * 7/2010 Harada .............. D21H 13/16
                                                   428/364
9,142,816 B2 * 9/2015 Hayakawa ........ H01M 2/1626

2002/0142226 A1  10/2002  Zguris et al.
2006/0014080 A1   1/2006  Kubo et al.
2009/0017385 A1   1/2009  Harada et al.
2013/0183569 A1   7/2013  Hayakawa et al.
2018/0047961 A1   2/2018  Igawa et al.

FOREIGN PATENT DOCUMENTS

| CN | 1710733 A | 12/2005 |
|---|---|---|
| JP | 2-119049 A | 5/1990 |
| JP | 6-163024 A | 6/1994 |
| JP | 6-231746 A | 8/1994 |
| JP | 2000-513865 A | 10/2000 |
| JP | 2006-236808 A | 9/2006 |
| JP | 5032748 B2 | 7/2012 |
| JP | 2016-171166 A | 9/2016 |
| KR | 10-2013-0106396 A | 9/2013 |
| WO | 98/00875 A1 | 1/1998 |
| WO | 2012/036025 A1 | 3/2012 |

OTHER PUBLICATIONS

Office Action dated Apr. 12, 2018 in corresponding Korean Patent Application No. 10-2018-7007246 (with English Translation), 12 pages.
International Search Report and Written Opinion dated Dec. 20,2016 in PCT/JP2016/077104 filed Sep. 14, 2016.
Office Action dated Apr. 12, 2018 in corresponding Japanese Patent Application No. 10-2018-7007246 (with English Translation), 18 pages.
Office Action in corresponding Chinese Patent Application No. 201680053253.2 dated Nov. 14, 2018.

\* cited by examiner

*Primary Examiner* — Nicholas P D'Aniello
(74) *Attorney, Agent, or Firm* — Oblon, McClelland, Maier & Neustadt, L.L.P.

(57) ABSTRACT

An alkaline battery separator having alkali-resistant fibers, beaten cellulose fibers and a binder, wherein an overall freeness, in terms of CSF, is at least 700 ml and at most 765 ml; weight ratios of the alkali-resistant fibers and the beaten cellulose fibers are 28:72 to 72:28; the beaten cellulose fibers comprise mercerized natural wood fibers having a freeness, in terms of CSF, of at least 150 ml and less than 550 ml; and at least a portion of the alkali-resistant fibers is polyvinyl alcohol-based fibers.

18 Claims, No Drawings

ALKALINE BATTERY SEPARATOR

TECHNICAL FIELD

The present invention relates to an alkaline battery separator suitable for an alkaline battery that uses an alkaline electrolyte solution, and an alkaline battery comprising the separator.

BACKGROUND ART

Generally, in an alkaline battery, negative ions each having a negative charge are moved from a positive electrode thereof toward a negative electrode thereof and positive ions each having a positive charge are moved from the negative electrode toward the positive electrode, through an alkaline electrolyte solution thereof, and a separator is used between the positive and negative electrodes for separating these two electrodes from each other and for isolating a positive electrode active material and a negative electrode active material from each other. To this alkaline battery separator, various types of performance are required such as, for example, preventing any internal short-circuiting between the positive electrode active material and the negative electrode active material, retaining a high absorbent property for electrolyte solutions to generate a sufficient electrogenic reaction, taking a less occupancy when the separator is incorporated into the battery to increase the amounts of the positive electrode active material and the negative electrode active material (for prolonging the usable time of the battery), retaining the durability that prevents shrinkage and/or deterioration caused by an alkaline electrolyte solution and an alkaline depolarizes, and preventing any buckling that is caused by vibrations generated during transportation or toting of the battery or by an impact generated by falling down of the battery, and any internal short-circuiting, after being incorporated in the battery.

It has been proposed to use, in combination, alkali-resistant synthetic fibers and cellulose fibers obtained by precipitating cellulose directly from a solution that is obtained by dissolving cellulose in an organic solvent, to impart these types of performance to the separator. For example, Patent Document 1 discloses an alkaline battery separator that uses polyvinyl-based fibers and a fibrillated substance of solvent-spun cellulose fibers having a specific degree of beating, to improve its shielding property, its absorbent property for electrolyte solutions, and the like. Patent Document 2 discloses an alkaline battery separator that uses alkali-resistant synthetic fibers, and organic solvent-spun rayon fibers of purified cellulose fibers that have alkali resistance and that are capable being beaten, to prevent any internal short-circuiting and improve the alkali resistance, the denseness, the liquid retentivity, the electric property, and the like. Patent Document 3 discloses an alkali battery separator that uses alkali-resistant fibers, a fibrillated substance of organic solvent-spun cellulose fibers having a specific degree of beating, and mercerized natural pulp, to improve the impact resistance.

PRIOR ART DOCUMENTS

Patent Documents

[Patent Document 1]: Japanese Laid-Open Patent Publication No. 06-163024
[Patent Document 2]: Japanese Laid-Open Patent Publication No. 06-231746
[Patent Document 3]: Japanese Laid-Open Patent Publication No. 2006-236808

SUMMARY OF THE INVENTION

Problems to be Solved by the Invention

Each of the alkaline battery separators disclosed in the Patent Documents as above, however, uses a large amount of organic solvent-spun cellulose fibers to impart or improve the various types of performance, and a problem arises for improvement from the economic viewpoint because the material cost of the organic solvent-spun cellulose fibers is expensive. In addition, when the ratio of the organic solvent-spun cellulose fibers constituting the separator becomes high, the separator tends to be easily shrunk and deteriorated in the alkaline electrolyte solution, and the separator is not fully satisfying as to the durability as a separator.

An object of the present invention is to economically and highly productively provide an alkaline battery separator whose swelling in an alkaline electrolyte solution is fully suppressed and that has various excellent properties such as a shielding property, an absorbent property for electrolyte solutions, and impact resistance as well as high alkali resistance, for the alkaline battery separator to be more suitable for actual use compared to the conventional alkaline battery separators.

Only the degree of beating (a freeness) of each individual beaten cellulose fibers such as the organic solvent-spun cellulose fibers is noted for each of the alkaline battery separators disclosed in Patent Documents as above while, even when beaten celluloses having the equal degree of beating are each used for the separator, the properties (such as, for example, the degree of swelling) of each of the obtained separators may have significant difference. As a result of a degraded papermaking property, the productivity of the separator may also be degraded. With the prior art, any sufficient control is therefore not necessarily enabled for the physical properties and the properties required as a separator and the productivity of the separator.

An another object of the present invention is to propose new indexes to more easily and more accurately control the physical properties and the properties required as a separator and the productivity of the separator, so as to provide an alkaline battery separator capable of being highly productively manufactured and more suitable for actual use.

Means for Solving Problems

The inventors actively studied and, as a result, found that the above problems were able to be solved by using beaten cellulose fibers of mercerized natural wood fibers having a specific freeness, instead of the fibrillated substance of the organic solvent-spun cellulose fibers, and alkali-resistant fibers at specific blending ratios, and thereby setting the overall freeness of the alkali-resistant fibers and the beaten cellulose fibers to be in a specific range. The inventors thereby completed the present invention. The present invention provides an aspect [1] and preferred aspects [2] to [13] as below.

[1] An alkaline battery separator comprising alkali-resistant fibers, beaten cellulose fibers, and a binder, wherein
1) the overall freeness, in terms of CSF, is at least 700 ml, wherein
2) the weight ratios of the alkali-resistant fibers and the beaten cellulose fibers are 28:72 to 72:28, and wherein
3) the beaten cellulose fibers comprise mercerized natural wood fibers having a freeness, in terms of CSF, of at least 150 ml and less than 550 ml.

[2] The alkaline battery separator according to [1], wherein at least a portion of the alkali-resistant fibers is polyvinyl alcohol-based fibers.

[3] The alkaline battery separator according to [1] or [2], wherein the binder is a polyvinyl alcohol-based binder.

[4] The alkaline battery separator according to any one of [1] to [3], wherein the weight ratios of the alkali-resistant fibers, the beaten cellulose fibers, and the binder are 25 to 60:25 to 60:5 to 20.

[5] The alkaline battery separator according to any one of [1] to [4], wherein the freeness of the mercerized natural wood fibers, in terms of CSF, is at least 150 ml and less than 450 ml.

[6] The alkaline battery separator according to any one of [1] to [5], wherein a content of a fibrillated substance of organic solvent-spun cellulose fibers is 10% by weight or less based on the total weight of the separator.

[7] The alkaline battery separator according to any one of [1] to [6], further comprising regenerated cellulose fibers, wherein a content of the regenerated cellulose fibers is 25% by weight or less based on the total weight of the separator.

[8] The alkaline battery separator according to any one of [1] to [7], wherein a fineness of the alkali-resistant fibers is 0.1 to 0.8 dtex.

[9] The alkaline battery separator according to any one of [1] to [8], wherein an air permeability of the alkaline battery separator is 13 cc/cm$^2$/sec or lower.

[10] The alkaline battery separator according to any one of [1] to [9], wherein a degree of swelling of the alkaline battery separator in a 35%-KOH water solution at 25° C. is 41% or lower.

[11] The alkaline battery separator according to any one of [1] to [10], wherein the alkali elution amount of the alkaline battery separator in a 35%-KOH water solution at 60° C. is 3% or lower.

[12] The alkaline battery separator according to any one of [1] to [11], wherein the weight per unit area of the alkaline battery separator is 20 to 50 g/m$^2$, and wherein a thickness of the alkaline battery separator is 70 to 150 μm.

[13] An alkaline battery comprising the alkaline battery separator according to any one of [1] to [12].

Effect of the Invention

According to the present invention, an alkaline battery separator whose swelling in an alkaline electrolyte solution can sufficiently be suppressed and that has excellent various properties such as a shielding property, an absorbent property for electrolyte solutions, and impact resistance as well as high alkali resistance can be economically and highly productively provided.

DESCRIPTION OF EMBODIMENTS

An embodiment of the present invention will be described in detail below.

An alkaline battery separator of the present invention comprises alkali-resistant fibers, beaten cellulose fibers, and a binder. The alkaline battery separator of the present invention is formed by tangling the extremely thin beaten cellulose fibers each finely subdivided by being beaten, with a support body formed by the alkali-resistant fibers and the binder.

In the present invention, the alkali-resistant fibers mean fibers that present chemical durability against alkali. Examples of the alkali-resistant fibers generally include, for example, alkali-resistant synthetic fibers, alkali-resistant organic fibers such as alkali-resistant cellulose fibers, and alkali-resistant inorganic fibers such as alkali-resistant glass fibers. As to the alkali-resistant synthetic fibers, the elution amount thereof in an alkaline electrolyte solution is small compared to those of other types of fibers such as glass fibers, and the alkali resistance thereof is very high. It is preferred that the alkaline battery separator of the present invention comprises the alkali-resistant synthetic fibers as the alkali-resistant fibers which constitute the alkaline battery separator of the present invention.

Examples of the alkali-resistant synthetic fibers capable of constituting the alkaline battery separator of the present invention include, for example, polyvinyl alcohol-based fibers, ethylene-vinyl alcohol-based copolymer fibers, polypropylene fibers, polyethylene fibers, polyamide fibers, polypropylene-polyethylene composite fibers, and polyamide-modified polyamide composite fibers. Any one of these may be used alone, or two or more thereof may be used in combination. Above all, it is preferred that the polyvinyl alcohol-based fibers are used as the alkali-resistant fibers because of the excellent affinity (wettability) thereof with the electrolyte solution.

Especially, in the present invention, it is preferred that the polyvinyl alcohol-based fibers having an in-water dissolution temperature of 90° C. or higher (for example, about 90 to about 200° C.) and especially 100° C. or higher (for example, about 100 to about 150° C.) be used as the alkali-resistant fibers. Specifically, fibers comprising a vinyl alcohol-based polymer which has an average polymerization degree of 1,000 to 5,000 and a saponification degree of 95% by mol or higher are advantageously used. The vinyl alcohol-based polymer may be copolymerized by another copolymer component, but in this case, it is preferred that the copolymerization amount is 20% by mol or lower and especially 10% by mol or lower from the points of water resistance and the like. Treatment such as acetalization may be applied when necessary.

In the present invention, when the polyvinyl alcohol-based fibers are used, the polyvinyl alcohol-based fibers do not need to comprise only the vinyl alcohol-based polymer and may comprise another polymer. The polyvinyl alcohol-based fibers may be composite-spun fibers, mixed-spun fibers (see-island fibers), or the like, with another polymer. From the viewpoints of the absorbent property for electrolyte solutions and the mechanical performance, it is preferred that the polyvinyl alcohol-based fibers are used that preferably comprise a polyvinyl alcohol-based polymer in an amount of 30% by weight or higher, more preferably 50% by weight or higher, and further preferably 80% by weight or higher, based on the total weight of the polyvinyl alcohol-based fibers.

In one preferred embodiment of the present invention, the alkaline battery separator of the present invention comprises the polyvinyl alcohol-based fibers as at least a portion of the alkali-resistant fibers. Because the polyvinyl alcohol-based fibers have high resistance against alkaline electrolyte solutions and are also excellent in the absorbent property for electrolyte solutions, the alkali resistance and the absorbent property for electrolyte solutions of the separator can be improved by using the polyvinyl alcohol-based fibers as the alkali-resistant fibers. In addition, the stiffness is improved by using the polyvinyl alcohol-based fibers, and thus, deformation of the separator arranged in a battery can be suppressed.

In the present invention, the fineness of the alkali-resistant fibers preferably is 0.1 dtex or higher, more preferably is 0.2 dtex or higher, preferably is 1.0 dtex or lower, more preferably is 0.8 dtex or lower, and further preferably is 0.6 dtex or lower. When the fineness of the alkali-resistant fibers is in the above ranges, the separator is excellent in the shielding property (the air permeability) and, as to the manufacture of the separator, a proper thickness can be secured in a stage before an adjustment to obtain a set thickness after the papermaking. It is preferable that the average fiber length of the alkali-resistant fibers be about 1 to 6 mm. In the present invention, plural types of fibers having different finenesses and/or fiber lengths may be used in combination. The thickness of a paper sheet obtained by the papermaking can thereby be controlled to be a desired thickness, and the thickness required as the separator can therefore be secured.

The alkaline battery separator of the present invention comprises the beaten cellulose fibers. In the present invention, the beaten cellulose fibers comprise mercerized natural wood fibers. The mercerized natural wood fibers are not especially limited as far as the mercerized natural wood fibers are obtained by applying mercerization treatment to natural wood fibers. Examples of the mercerized natural wood fibers include the one obtained by applying the mercerization treatment to broad-leaf tree wood pulp and the one obtained by applying mercerization treatment to needle-leaf tree wood pulp. One type of natural wood fibers may be used alone, or two or more types thereof may be used in combination.

The alkaline battery separator of the present invention can sufficiently suppress its swelling in the alkaline electrolyte solution by comprising therein the mercerized natural wood fibers. For the beaten organic solvent-spun cellulose fibers used in the prior art, fibers thereof are finely subdivided from the fibers to be trunks and the finely subdivided fibers tangle with each other to suppress the swelling of the separator to a specific degree. However, the trunks themselves swell since the portion to be the trunks maintains the large fiber diameter retained by the fibers before being beaten, and thus the swelling suppression effect of the separator is limited. In contrast, as to the mercerized natural wood fibers, the fibers are cut in both of the longitudinal direction and the cross-sectional direction of the fibers by being beaten. Any fibers to be the thick trunk portions such as those generated when the organic solvent-spun cellulose fibers are beaten tend to avoid remaining, and the subdivided extremely thin fibers tangle with each other in the form for the fibers to mutually have proper voids. A more excellent swelling suppression effect can thereby be obtained. As to cellulose fibers different from the natural wood fibers such as, for example, cotton linter pulp and hemp pulp, the fibers are mainly cut in the longitudinal direction because the cut cross-section of each of the fibers has an oval shape. The surface layer face of the fiber is therefore fibrillated. In this case, compared to the natural wood fibers whose fiber cross-sections each have a flattened shape, the fiber diameter originally retained by each of the fibers tends to be maintained after the beating and the portions to be the trunks remain. The fiber portions to be the trunks therefore each tend to increase its height during the swelling. Even compared to the case where beaten cellulose fibers originated from plants other than the natural wood are used, the alkaline battery separator of the present invention can suppress the degree of swelling to be low. The natural wood fibers are a material that is inexpensively available compared to the traditionally-used organic solvent-spun cellulose fibers, and the natural wood fibers therefore have an economic advantage for the manufacture of the separator.

The beaten cellulose fibers of the mercerized wood fibers, which constitute the alkaline battery separator of the present invention, have the freeness, in terms of the Canadian Standard Freeness (CSF), of at least 150 ml and less than 550 ml. This freeness is an index indicating the degree of the beating of the fibers. In the case where the freeness of the beaten cellulose fibers is less than 150 ml, when the paper layer is formed at the papermaking step, the fibers tend to drop off from the papermaking screen and the yield may be degraded. The paper sheet obtained by the papermaking also tends to have a high density and it may be difficult to obtain the thickness required as the separator. On the other hand, when the freeness of the beaten cellulose fibers is 550 ml or more, because the fibers which constitute the paper sheet become thick, the value of the air permeability becomes high and a separator inferior in the shielding property may be obtained. In the present invention, the upper limit of the freeness of the beaten cellulose fibers of the mercerized natural wood fibers preferably is less than 500 ml, more preferably is less than 450 ml, further preferably is less than 400 ml, especially preferably is less than 350 ml, and further especially preferably is less than 300 ml. From the viewpoint of the papermaking property, the lower limit of the freeness of the beaten cellulose fibers of the mercerized natural wood fibers preferably is 200 ml and more preferably is 220 ml. In one preferred embodiment of the present invention, the freeness of the beaten cellulose fibers of the mercerized natural wood fibers, for example, preferably is at least 150 ml and less than 450 ml, more preferably is at least 200 ml and less than 400 ml, further preferably is at least 200 ml and less than 350 ml, especially preferably is at least 220 ml and less than 350 ml, and further especially preferably is at least 220 ml and less than 300 ml. In the present invention, one type of beaten cellulose fibers of mercerized natural wood fibers having a desired freeness may be used, and plural types of beaten cellulose fibers of mercerized natural wood fibers each having a freeness different from that of each other may be used.

The values of the freeness are values measured in accordance with a measurement method defined in JIS P8121 "Freeness Testing Method for Pulp".

Beaten cellulose fibers having a desired freeness can be produced by beating unbeaten mercerized natural wood fibers using, for example, a beater, a refiner, or a high-speed disintegrator. Above all, in the beating treatment conducted using a refiner, the fibers to be treated by the beating can skillfully be captured based on the mechanical structure thereof compared to the case where the beating is conducted using a beater or a high-speed disintegrator, and the beating can efficiently be conducted in a short time period to obtain the aimed freeness (the degree of beating). The overall fibers can be set to uniformly be fine because the fibers tend to avoid being excessively thin and, in contrast, any thick fibers tend to avoid remaining. The use of the uniformly beaten mercerized natural wood fibers as the beaten cellulose fibers leads to stabilization of the value of the overall freeness, facilitates the adjustment of the overall freeness to obtain a constant value thereof, and improves the suppression effect for the degree of swelling. In the present invention, it is therefore preferred that unbeaten mercerized natural wood fibers be beaten using a refiner, and the fibers can more uniformly be beaten by, for example, properly adjusting the clearance of the refiner. No metal parts may be brought into direct contact with each other in the refiner and substantially no metallic contamination is therefore likely to be generated. Any fibers contaminated by any metal act as a cause of short-circuiting when these fibers are used as the separator. The use of the refiner is advantageous also in the point that fibers can be beaten without generating any metallic contamination.

The alkaline battery separator of the present invention may comprise a fibrillated substance of organic solvent-spun cellulose fibers as the beaten cellulose fibers. The "organic solvent-spun cellulose fibers" in the present invention refers to fibers that are different from regenerated cellulose fibers described later and that are formed by precipitating cellulose directly from a solution obtained by dissolving cellulose in an organic solvent without chemically changing the cellulose. In particular, examples thereof include, for example, organic solvent-spun cellulose fibers produced by a method according to which an undiluted spinning solution formed by dissolving cellulose in an amine oxide is dry-wet spun in water to precipitate cellulose and the obtained fibers are further stretched. Typical examples of these fibers include lyocell, and this is sold under a trade name of "Tencel" (a registered trademark) from Lenzing AG in Austria.

In the sense that both of the mercerized natural wood fibers and the fibrillated substance of the organic solvent-spun cellulose fibers have alkali resistance, it can be stated that they are each one type of alkali-resistant fibers (alkali-resistant cellulose fibers), but in the present invention, the "mercerized natural wood fibers", the "fibrillated substance of the organic solvent-spun cellulose fibers", and those substantially similar to these are handled to be comprised in the "beaten cellulose fibers" and to be distinguished from the "alkali-resistant fibers".

When the alkaline battery separator of the present invention comprises the fibrillated substance of the organic solvent-spun cellulose fibers as the beaten cellulose fibers, it is preferred that the freeness of the organic solvent-spun cellulose fibers is, in terms of CSF, about 5 ml to about 200 ml.

In the present invention, however, when the fibrillated substance of the organic solvent-spun cellulose fibers is used, the content thereof is preferably 10% by weight or lower based on the total weight of the separator, in order to sufficiently obtain the advantage based on the fact that the beaten cellulose fibers are the mercerized natural wood fibers. For example, in the case where the fibrillated substance of the organic solvent-spun cellulose fibers having a freeness substantially equal to that of the beaten cellulose fibers of the mercerized natural wood fibers is used, when the fibrillated substance of the organic solvent-spun cellulose fibers is excessive, the alkali resistance of the separator tends to be degraded and the degree of swelling thereof tends to be increased. When the fibrillated substance of the organic solvent-spun cellulose fibers is comprised, the thickness of the paper sheet after the papermaking tends to be increased and the water filtration time period tends to be increased compared to the case where the fibrillated substance of the organic solvent-spun cellulose fibers is not comprised. The amount of the fibrillated substance of the organic solvent-spun cellulose fibers in the alkaline battery separator of the present invention preferably is 10% by weight or lower, more preferably is 8% by weight or lower, further preferably is 5% by weight or lower, and especially preferably is 3% by weight or lower, based on the total weight of the separator. In one especially preferred embodiment of the present invention, the alkaline battery separator of the present invention does not comprise any fibrillated substance of the organic solvent-spun cellulose fibers.

The weight ratios of the alkali-resistant fibers and the beaten cellulose fibers which constitute the alkaline battery separator of the present invention (the alkali-resistant fibers: the beaten cellulose fibers) are 28:72 to 72:28. When the alkali-resistant fibers are lower than 28% by weight, the thickness at the time of the papermaking cannot properly be obtained and the papermaking property tends to be degraded. In addition, because the ratio of the beaten cellulose fibers having a relatively high degree of swelling becomes high, suppressing the degree of swelling of the separator to be low may therefore be difficult. On the other hand, in the case where the alkali-resistant fibers exceed 72% by weight, the amount of absorbed liquid tends to be reduced, liquid withering tends to occur, and no sufficient discharged capacity may be able to be secured when this separator is used in a battery as its separator. The weight ratios of the alkali-resistant fibers and the beaten cellulose fibers preferably are in a range of 30:70 to 70:30, more preferably are in a range of 35:65 to 65:35, and further preferably are in a range of 40:60 to 60:40.

The alkaline battery separator of the present invention has the overall freeness of, in terms of CSF, at least 700 ml. In the present invention, the "overall freeness" means the freeness of the overall fibers that constitute the alkaline battery separator. For example, when the alkaline battery separator of the present invention comprises the alkali-resistant fibers, the beaten cellulose fibers, and the binder, the fibers ultimately constituting the separator are the alkali-resistant fibers and the beaten cellulose fibers, and the overall freeness is a value measured for the two types of fibers together with each other. Even when fibers originated from the binder are finally present in the separator by using a fibrous binder, these fibers are not taken into consideration for calculating the overall freeness. The overall freeness is measured in accordance with the measurement method defined in JIS P8121 "Freeness Testing Method for Pulp" similarly to the freeness of the above beaten cellulose fibers after mixing the types of fibers ultimately constituting the separator (except the binder fibers) with each other at the constituent ratios.

The alkaline battery separator of the present invention has the overall freeness of, in terms of CSF, at least 700 ml, and has the overall freeness preferably of at least 710 ml and preferably of at least 720 ml.

Obtaining highly productively a separator effectively suppressing the swelling thereof and having a high shielding property is enabled by setting the overall freeness to be the lower limit value or higher after controlling the freeness of the beaten cellulose fibers and the weight ratios of the alkali-resistant fibers and the beaten cellulose fibers to be within the above predetermined ranges. The upper limit of the overall freeness is usually about 780 ml. When the overall freeness becomes high, the shielding property of the obtained separator tends to be degraded. It is therefore preferred that the alkaline battery separator of the present invention have the overall freeness of, in terms of CSF, 770 ml or less and is more preferred that the alkaline battery separator have the overall freeness of 765 ml or less.

In the prior art, only the individual freeness of each type of fibers such as the beaten cellulose fibers of the organic solvent-spun cellulose fibers is often specified (see, e.g., Patent Documents 1 to 3). In the case where only the individual freeness of each type of fibers is noted, even when the freeness of each type of the used fibers is set to be substantially equal, the values of the physical properties such as the air permeability and the degree of swelling of the obtained separator may differ among the separators and the properties as the separator may significantly differ among the separators. The control of the productivity of the separator may also be difficult, since the thickness of the paper sheet after the papermaking increases and thus the water filtration time period increases.

In the present invention, in addition to the individual freeness of each type of the fibers, the freeness of the overall fibers ultimately constituting the separator is set to be within a specific range. This enables more accurate control of the physical properties and the productivity of the separator that are not sufficiently controlled when only the freeness of each type of fibers is noted. Especially, although the overall freeness is a parameter closely related to the papermaking property, and the value itself of the overall freeness is varied depending on the types of fibers which constitute the separator, the blending amounts thereof and the like, the papermaking property tends to be degraded when the overall freeness is less than the specific value. Using the overall freeness as one index, the state substantially same as that of the actual papermaking can be checked using the value thereof, and the productivity of the separator can easily and accurately be controlled at the industrial level. That is, the overall freeness can be one new index that is not present in the prior art for controlling the productivity. The present invention can provide an alkaline battery separator capable of being highly productively manufactured, by setting the value of the overall freeness to be in the above ranges.

The overall freeness does not simply reflect the freeness of each of the types of fibers which constitute the separator. The value of the overall freeness is related to the type of the beaten cellulose fibers, the freeness and the beating method thereof, the types of the beaten cellulose fibers and the alkali-resistant fibers, their combination and their weight ratios, and the like. The overall freeness can be increased by, for example, increasing the freeness of the beaten cellulose fibers, expanding the size distribution of the beaten cellulose, reducing the rate of the beaten cellulose fibers relative to the weight ratios of the beaten cellulose fibers and the alkali-resistant fibers, combining any of these items, or the like.

The alkaline battery separator of the present invention comprises the binder. The binder used in the present invention is not especially limited as far as the binder can bond the alkali-resistant fibers and the beaten cellulose fibers to each other. Examples thereof include, for example, a polyvinyl alcohol-based binder, and an ethylene-vinyl alcohol-based binder. Above all, it is preferred that the polyvinyl alcohol-based binder is used from the viewpoints of the electrolyte solution resistance, the liquid absorbent property, and the like. The forms of fibers, powder, and a solution are present as the form of the binder and any one of these is usable, while it is preferred that the fiber-form binder is used when the separator is sheet-made using wet sheet-making. When the binder is in the power form or the solution form, it is necessary to dissolve the binder to develop the sheet strength of the separator. In this case, the polyvinyl alcohol forms a coating film and closes the voids among the fibers of the separator, and this may cause degradation of the absorbent property for electrolyte solutions and an increase of the internal resistance of the battery. In contrast, when the fiber-form binder is used, the binder fibers, and the alkali-resistant fibers and the beaten cellulose fibers which constitute the separator can be spot-bonded to each other at their intersections without completely dissolving the binder to leave the fiber form thereof as it is using a means of reducing the carried-in moisture before the drying, or the like. This is especially preferred because this can enhance the strength of the separator without causing any degradation of the absorbent property for electrolyte solutions and any increase of the internal resistance of the battery.

The in-water dissolution temperature of the polyvinyl alcohol-based binder fibers suitable for this preferably is 60 to 90° C. and more preferably is 70 to 90° C. Fibers comprising a polyvinyl alcohol-based polymer which has an average polymerization degree of about 500 to about 3,000 and a saponification degree of 97 to 99% by mol are advantageously used. The fibers may be composite spun fibers, mixed spun fibers (see-island fibers), or the like, with another polymer. It is preferred that the polyvinyl alcohol-based fibers be used that preferably comprise the polyvinyl alcohol-based polymer in an amount of 30% by weight or higher, preferably at 50% by weight or higher, and further preferably at 80% by weight or higher from the viewpoints of the absorbent property for electrolyte solutions, the mechanical performance, and the like. It is preferred that the fineness be about 0.01 to about 3 dtex and it is preferred that the fiber length is about 1 to about 5 mm, from the viewpoints of the water dispersibility, the adhesiveness for other components, the pore size, and the like.

For the alkaline battery separator of the present invention, it is preferred that the weight ratios of the alkali-resistant fibers, the beaten cellulose fibers, and the binder (the alkali-resistant fibers:the beaten cellulose fibers:the binder) are 25 to 60:25 to 60:5 to 20. When the weight ratios of the components constituting the separator are in the above range, a separator having the liquid retentivity and the dynamic properties well balanced therebetween is established. In the present invention, it is more preferred that the weight ratios of the alkali-resistant fibers, the beaten cellulose fibers, and the binder are in a range of 30 to 55:30 to 55:10 to 20.

In one preferred embodiment of the present invention, the alkaline battery separator of the present invention comprises only alkali-resistant synthetic fibers as the alkali-resistant fibers. The alkaline battery separator of the present invention may however comprise another type of alkali-resistant fibers different from the alkali-resistant synthetic fibers, such as, for example, regenerated cellulose fibers, as the alkali-resistant fibers.

The "regenerated cellulose fibers" means fibers obtained by chemically converting cellulose into a cellulose derivative and thereafter converting the cellulose derivative again back to cellulose (hereinafter, referred to as "regenerated cellulose fibers"). Examples of the regenerated cellulose fibers comprise, for example, viscose rayon, polynosic rayon, high-tenacity rayon, and cuprammonium rayon. Each of the above may be used alone, or two or more thereof may be used in combination.

When the alkaline battery separator of the present invention comprises the regenerated cellulose fibers as the alkali-resistant fibers, it is preferred that the content thereof is 25% by weight or lower based on the total weight of the separator. When the content of the regenerated cellulose fibers is excessive, the degree of swelling of the separator tends to be high and the content of the regenerated cellulose fibers more preferably is 15% by weight or lower, and especially preferably is 10% by weight or lower. The lower limit value of the content of the regenerated cellulose fibers is not especially limited and the alkaline battery separator may not comprise the regenerated cellulose fibers at all, while the content may be, for example, 0.1% by weight or higher, or 1% by weight or higher, or 3% by weigh or higher.

When the alkaline battery separator comprises the regenerated cellulose fibers at the rate of the above upper limit or lower as the alkali-resistant fibers in addition to the alkali-resistant synthetic fibers, the proper thickness of the paper sheet after the papermaking can easily be obtained and, at the manufacture step of the separator, the control becomes easy to obtain the thickness that is set as the thickness for the finally obtained separator to have. In one preferred embodiment of the present invention, the alkaline battery separator of the present invention comprises both of the alkali-resistant synthetic fibers and the regenerated cellulose fibers as the alkali-resistant fibers.

The types of fibers which constitute the alkaline battery separator of the present invention can properly be selected from the types of fibers exemplified above in accordance with the desired physical properties and the like and can be combined with each other. For example, in one preferred embodiment of the present invention, the alkaline battery separator of the present invention comprises only the polyvinyl alcohol-based fibers as the alkali-resistant fibers, and comprises only the mercerized natural wood fibers as the beaten cellulose fibers. In another preferred embodiment, the alkaline battery separator of the present invention comprises only the polyvinyl alcohol-based fiber as the alkali-resistant fibers and comprises the mercerized natural wood fibers and the fibrillated substance of organic solvent-spun cellulose fibers as the beaten cellulose fibers. In another preferred embodiment, the alkaline battery separator of the present invention comprises the polyvinyl alcohol-based fibers and the regenerated cellulose fibers as the alkali-resistant fibers and comprises only the mercerized natural wood fibers as the beaten cellulose fibers. In yet another preferred embodiment, the alkaline battery separator of the present invention comprises the polyvinyl alcohol-based fibers and the regenerated cellulose fibers as the alkali-resistant fibers and comprises the mercerized natural wood fibers and the fibrillated substance of the organic solvent-spun cellulose fibers as the beaten cellulose fibers.

The alkaline battery separator of the present invention has the air permeability of preferably 13 cc/cm$^2$/sec or lower. The air permeability represents the denseness of the separator and acts as an index of the shielding property. The air permeability can be controlled by adjusting the overall freeness, the freeness of the beaten cellulose fibers, the blending ratios of the types of fibers constituting the separator, and the like. In the case where the value of the air permeability is small, the obtained separator is excellent in the shielding property and, when the separator is incorporated in a battery, the separator can effectively prevent internal short-circuiting. When the air permeability is 13 cc/cm$^2$/sec or smaller, this effect is especially highly achieved. The air permeability of the alkaline battery separator of the present invention more preferably is 12 cc/cm$^2$/sec or smaller, further preferably is 11 cc/cm$^2$/sec or smaller, and especially preferably is 9 cc/cm$^2$/sec or smaller. The lower limit value of the air permeability is not especially limited, but the lower limit value usually is, for example, 1 cc/cm$^2$/sec or larger.

The air permeability is measured in accordance with the measurement method defined in JIS L 1096 6.27 "General Fabric Testing Method, Air Permeability".

As to the alkaline battery separator of the present invention, from the viewpoints of securing large electric capacitance and increasing the battery operable time period, the degree of swelling thereof in a 35%-KOH water solution at 25° preferably is 41% or lower, more preferably is 40% or lower, further preferably is 38% or lower, and especially preferably is 35% or lower. The lower limit value thereof is not especially limited, but the lower limit value thereof usually is, for example, about 10%. The degree of swelling can be controlled by adjusting the freeness of the beaten cellulose fibers, the combination of the types of the alkali-resistant fibers and the beaten cellulose fibers, their blending ratios, and the like.

The degree of swelling is calculated in accordance with the following equation, from the thickness determined by measuring the thickness of a separator test piece whose thickness is measured in advance, after immersing the separator test piece in a 35%-KOH water solution for 60 minutes at 25° C. and conducting liquid draining for the separator test piece.

The degree of swelling=(the thickness after the immersion−the thickness before the immersion)/ the thickness before the immersion×100

In detail, the degree of swelling can be measured using the method described in Examples described later.

As to the alkaline battery separator of the present invention, from the viewpoint of securing high durability, the alkali elution amount in a 35%-KOH water solution at 60° C. preferably is 3% or lower and more preferably is 2.7% or lower. When the alkali elution amount is 3% or lower, the separator has high durability with which the separator does not shrink and is not degraded against a strong alkaline electrolyte solution. The alkali elution amount can be controlled by the types of the used alkali-resistant fibers, the blending amounts thereof, and the like, but the alkali elution amount of the obtained separator tends to be large when the separator comprises the fibrillated substance of the organic solvent-spun cellulose fibers as the beaten cellulose fibers, as mentioned above. Therefore, a separator whose alkali elution amount is small and that is excellent in the alkali resistance can be obtained by reducing the content of the fibrillated substance of the organic solvent-spun cellulose fibers or by not blending any fibrillated substance of the organic solvent-spun cellulose fibers.

The alkali elution amount is calculated in accordance with the following equation, from the weight of a separator test piece whose weight is measured after the separator test piece is dried for 12 hours at 105° C., that is measured after the separator test piece is immersed in a 35%-KOH water solution for 48 hours at 60° C., is washed and neutralized with water, and is again dried for 12 hours at 105° C.

The alkali elution amount=(1−the weight after the immersion/the weight before the immersion)× 100

In detail, the alkali elution amount can be measured using the method described in Examples described later.

From the viewpoint of retaining sufficient liquid retentivity, the alkaline battery separator of the present invention has the electrolyte solution absorption amount that preferably is 4.2 g/g or larger and more preferably is 4.5 g/g or larger. The upper limit value of the electrolyte solution absorption amount is not especially limited, but the upper limit value usually is, for example, 7.0 g/g or smaller.

The electrolyte solution absorption amount is calculated in accordance with the following equation, from the weight determined by measuring the weight of a separator test piece whose weight is measured in advance, after immersing the separator test piece in a 35%-KOH water solution for 30 minutes at an ordinary temperature (20 to 25° C.) and conducting liquid draining for the separator test piece.

The electrolyte solution absorption amount (g/g)= (the weight after the immersion−the weight before the immersion)/the weight before the immersion In detail, the electrolyte solution absorption amount can be measured using the method described in Examples described later.

The alkaline battery separator of the present invention has the tensile strength that preferably is 2.5 kg/15 mm or higher and more preferably is 3.0 kg/15 mm or higher from the viewpoint of retaining a sufficient impact resistance against an impact generated by falling down or the like. The upper limit thereof is not especially limited, but the tensile strength usually is, for example, about 7.0 kg/15 mm. It is preferred that the separator have the ring crush strength that preferably is 180 g or higher and more preferably is 200 g or higher. The upper limit of the ring crush strength is not especially limited, but the upper limit of ring crush strength usually is, for example, about 500 g. The ring crush strength in the present invention is an index of so-called "stiffness strength" of the alkaline battery separator.

The tensile strength and the ring crush strength can be measured using the methods described in Examples described later.

The alkaline battery separator of the present invention has the liquid absorption rate that preferably is 600 sec/25 mm or lower and more preferably is 300 sec/25 mm or lower. When the liquid absorption rate is in the above ranges, this is advantageous from the view point of the productivity because the liquid absorption into the separator is completed during the time period from the time after injection of the electrolyte solution to the time for the next step in the battery manufacture line.

The liquid absorption rate can be measured using the method described in Examples described later.

The weigh per unit area and the thickness of the alkaline battery separator of the present invention may properly be set in accordance with the type and the like of the battery into which the separator is incorporated, and for example, the weight per unit area (the set value) preferably is 20 to 50 g/m² and more preferably is 23 to 45 g/m². The thickness (the set value) preferably is 70 to 150 µm and more preferably is 80 to 130 µm.

The alkaline battery separator of the present invention can be manufactured using a known papermaking method. The alkaline battery separator can be manufactured by, for example, mixing the alkali-resistant fibers, the mercerized natural wood fibers having the predetermined freeness, and optionally the other fibers with each other, adding the binder thereto, dispersing the mixture in water to form slurry, and conducting papermaking for the slurry using an ordinary wet-paper machine. Examples of the papermaking screen used in the paper machine include a cylinder screen, a short screen, and a long screen, and each of these papermaking screens may be used alone to form a single layer, or any of these papermaking screens may be used in combination for combined papermaking to form plural layers. It is preferred that the combined papermaking for plural layers are employed and, above all, it is preferred that a two-layer combination paper sheet is produced using a short screen-cylinder paper machine, from the point of obtaining a paper sheet that has no texture unevenness, that is homogeneous, and that is excellent in the electric properties. The aimed alkaline battery separator is obtained by conducting papermaking using a wet-paper machine and thereafter drying the paper sheet using a Yankee dryer. Heat pressing and the like may be conducted if necessary. Hydrophilic treatment such as surfactant treatment may further be conducted from the viewpoint of improving the absorbent property for electrolyte solutions.

In the present invention, from the viewpoint of improving the productivity of the separator, it is preferred that the thickness of the separator obtained after the papermaking (the thickness obtained before the adjustment of the thickness) is set to be thicker by about 5 µm than the ultimately desired thickness of the separator. Because the hydrophilic treatment is conducted after the papermaking, it is preferred that the thickness of the separator obtained after the papermaking is set to be somewhat thicker than the thickness that is desired to ultimately be set. For example, when the ultimate thickness of the separator is 125 µm, it is preferred that the thickness of the separator obtained after the papermaking is 130 µm or larger. When the thickness of the separator obtained after the papermaking has the above relation with the ultimately desired thickness of the separator, controlling the thickness becomes easy in the adjustment of the thickness conducted thereafter and the thickness required as the separator can easily be secured.

From the view point of the papermaking property, it is preferred that the water filtration time period using the papermaking screen is a short time period. Because the forms of the types of papermaking screen are not same, when water is put in a papermaking cylinder of a TAPPI standard paper machine to the level of the papermaking screen face and slurry to form the weight per unit area to be measured is put therein, the time period until the time at which the water is fully drained is defined as the water filtration time period. When the set weight per unit area is 39 g/m² and the water filtration time period is measured with the weight per unit area that is ½ of the above, the water filtration time period preferably is 5.1 seconds or shorter, more preferably is 5.0 seconds or shorter, and further preferably is 4.8 seconds or shorter. It is preferred that the water filtration time period is 9.0 seconds or shorter when the water filtration time period is measured with the set weight per unit area of 39 g/m². When the water filtration time period is in the above ranges, the time period necessary for the papermaking is reduced and this leads to improvement of the productivity of the separator. When the water filtration time period is short, this is also advantageous in the point that a more uniform separator can be obtained because the formation improver (for example, polyethylene oxide) can be used in a large amount.

The alkaline battery separator of the present invention can advantageously be used in an alkaline battery.

An alkaline battery of the present invention can be manufactured using any ordinary method known to those skilled in the art as far as the alkaline battery comprises the alkaline battery separator of the present invention. Examples of the form of the separator in the alkaline battery comprise a cross strip (a cross-structure bottomed cylindrical separator), a round strip (a cylinder-wound cylindrical separator), and a spiral (a spiral-wound structure separator).

EXAMPLES

The present invention will be described in more detail with reference to Examples, but the present invention is not limited at all by Examples. "%" and "part" in Examples and Comparative Examples respectively represent "% by weight" and "part by weight" as far as not otherwise specified especially.

Separators were prepared in accordance with the compositions shown in Table 1 and Table 2, and analyses on the physical properties and the properties were conducted in accordance with the methods below.

[Freeness (CSF) (ml)]

The Canadian standard freeness was measured in accordance with JIS P 8121 "Freeness Testing Method for Pulp".

[Overall Freeness (CSF) (ml)]

The types of fibers of the composition which constitute the separator other than the binder fibers were mixed with each other at the ratios shown in Table 1 and Table 2, and then, for each of the mixtures, the Canadian standard freeness was measured in accordance with JIS P 8121 "Freeness Testing Method for Pulp".

[Weight Per Unit Area (g/m$^2$)]

This was measured in accordance with JIS P 8124 "Measurement Method of Meter Basis Weight for Paper Sheet".

[Thickness (mm), Density (g/cm$^3$)]

This was measured in accordance with JIS P 8118 "Testing Method for Thickness and Density for Paper Sheet and Paper Board".

[Tensile Strength (kg/15 mm)]

This was measured in accordance with JIS P 8113 "Tensile Strength Testing Method for Paper Sheet and Paper Board".

[Air Permeability (Cc/Cm$^2$/Sec)]

This was measured in accordance with JIS L 1096 6.27 "General Fabric Testing Method Air Permeability" using a Frajour-type testing machine.

[Absorbent Property for Electrolyte Solutions (g/g)]

A separator specimen (50 mm×50 mm) whose weight had been measured in advance was immersed in a 35%-KOH water solution for 30 minutes under a condition of a bath ratio of 1/100, natural liquid draining was conducted for the separator specimen for 30 seconds, and the weight of the separator specimen was thereafter again measured to calculate the absorbed liquid amount by dividing the weight of the absorbed liquid by the weight of the specimen obtained before the immersion.

[Liquid Absorption Rate (sec/25 mm)]

A separator specimen (having the height of 150 mm×the width of 25 mm) was immersed in a 35%-KOH water solution and the time period to the time at which the KOH water solution reached a height of 25 mm was measured.

[Degree of Swelling (%)]

10 separator specimens (each 50 mm×50 mm) were stacked on each other and their thickness (C mm) was measured using a thickness gauge: a dial thickness gauge (H-model). The 10 separator specimens stacked on each other were immersed in a 35%-KOH water solution for 60 minutes at an ordinary temperature (25° C.), were thereafter lifted from the solution, and water draining was conducted therefor for 30 seconds to measure the thickness (D mm) thereof.

The degree of swelling was calculated in accordance with the equation below.

Degree of swelling (%)(*D*−*C*)/*C*×100

[Ring Crush Strength (g)]

A separator specimen (45 mm×50 mm) was doubly rolled in a tube-like form and was inserted into a tube made from PP and having an internal diameter of 8 mm φ× a height of 40 mm such that the lateral direction of the separator matched with the longitudinal direction of the tube. Thereafter, a 35%-KOH water solution was added for the inserted separator in the tube form to get wet up to the tip of the upper portion thereof (at the height of 45 mm). And then, using a handy compression testing machine (KES-G5) manufactured by Kato Tech Co., Ltd., a loading plate (2 cm$^2$) was pulled down at a compression rate of 1 mm/sec to measure the compression strength of the specimen for 5 mm protruding from the tube.

[Alkali Elution Amount (%)]

A test piece of about 1 g was collected and drying treatment was conducted therefor at 105° C. for 12 hours. Then, the weight of the test piece (a g) was measured using a precision balance. The test piece after the measurement was immersed in a 35%-KOH water solution to be stored for 48 hours at 60°. The test piece was thereafter washed and neutralized with water and was thereafter dried for 12 hours at 105° C. to measure the weight thereof (b g) using a precision balance.

The alkali elusion amount was calculated in accordance with the equation below.

The alkali elution amount (%)=(1−*b*/*a*)×100

[Thickness after Papermaking (μm)]

This was measured in accordance with JIS P 8118 "Testing Methods for Thickness and Density for Paper Sheet and Paper Board".

[Water Filtration Time Period (Sec)]

A set weight per unit area fiber amount (2.4 g for the case of 39 g/m$^2$) and 1.5 L of water were treated at 2,500 rpm×5 minutes using a TAPPI standard repulper to produce slurry. A 100-mesh papermaking screen was placed in a TAPPI standard testing machine capable of producing a paper sheet of 25 cm×25 cm, and the water amount from the papermaking screen was adjusted to be 12.5 L comprising 500 ml of a 0.005% water solution that was prepared from the slurry and PAM (an auxiliary dispersant: PAMOL produced by Meisei Chemical Works, Ltd.) to be uniformly dispersed using a stirrer, and the time period from the start to the end of the dewatering was measured.

Preparation of Separator

Example 1

40% by weight of a substance formed by treating mercerized broad-leaf tree bleached kraft pulp (mercerized LBKP) using a refiner (the setting of clearance: 0.03 mm) to be adjusted to have the freeness, in terms of CSF, of 250 ml, 45% by weight of polyvinyl alcohol-based fibers of 0.3 dtex×3 mm (Vinylon, VN30300 produced by Kuraray Co., Ltd.), and 15% by weight of polyvinyl alcohol-based binder fibers of 1.1 dtex×3 mm (Vinylon Binder: VPB105-1×3 produced by Kuraray Co., Ltd.) were dispersed in water to produce slurry and papermaking was conducted in accordance with two-layer combined papermaking using a paper machine. After drying using a Yankee dryer, the thickness was adjusted (the set weight per unit area: 39 g/m$^2$, the set thickness: 125 μm) between an elastic roll and a metal roll to obtain an alkaline battery separator having the weight per unit area of 39.1 g/m$^2$ and the thickness of 127 μm.

Example 2

An alkaline battery separator having the weight per unit area of 39.4 g/m$^2$ and the thickness of 124 μm was obtained in the same manner as that of Example 1 except that the blending amount of the mercerized LBKP was varied to 30% by weight and the blending amount of the polyvinyl alcohol-based fibers was varied to 55% by weight.

Example 3

An alkaline battery separator having the weight per unit area of 39.1 g/m² and the thickness of 125 μm was obtained in the same manner as that of Example 1 except that mercerized LBKP having the freeness, in terms of CSF, of 400 ml was used as the beaten cellulose fibers.

Comparative Example 1

40% by weight of a substance formed by treating the mercerized LBKP using a refiner (the setting of clearance: 0.03 mm) to be adjusted to have the freeness, in terms of CSF, of 580 ml, 45% by weight of polyvinyl alcohol-based fibers of 0.3 dtex×3 mm (Vinylon, VN30300 produced by Kuraray Co., Ltd.), and 15% by weight of polyvinyl alcohol-based binder fibers of 1.1 dtex×3 mm (Vinylon Binder: VPB105-1×3 produced by Kuraray Co., Ltd.) were dispersed in water to produce slurry. Papermaking was conducted in accordance with two-layer combined papermaking using a paper machine. After drying using a Yankee dryer, the thickness was adjusted (the set weight per unit area: 39 g/m², the set thickness: 125 μm) between an elastic roll and a metal roll to obtain an alkaline battery separator having the weight per unit area of 39.2 g/m² and the thickness of 126 μm.

Comparative Example 2

An alkaline battery separator having the weight per unit area of 39.0 g/m² and the thickness of 124 μm was obtained that was produced in the same manner as that of Example 1 except that the mercerized LBKP having the freeness, in terms of CSF, of 770 ml was used as it was without conducting any beating treatment therefor, as the beaten cellulose fibers.

Comparative Example 3

An alkaline battery separator having the weight per unit area of 38.7 g/m² and the thickness of 125 μm was obtained in the same manner as that of Example 1 except that the blending amount of the mercerized LBKP having the freeness, in terms of CSF, of 250 ml was varied to 20% by weight and the blending amount of the polyvinyl alcohol-based fibers was varied to 65% by weight.

Comparative Example 4

An alkaline battery separator having the weight per unit area of 39.2 g/m² and the thickness of 126 μm was obtained in the same manner as that of Example 1 except that the blending amount of the mercerized LBKP having the freeness, in terms of CSF, of 250 ml was varied to 65% by weight and the blending amount of the polyvinyl alcohol-based fibers was varied to 20% by weight.

Comparative Example 5

An alkaline battery separator having the weight per unit area of 39.5 g/m² and the thickness of 127 μm was obtained in the same manner as that of Example 1 except that mercerized LBKP having the freeness, in terms of CSF, of 140 ml was used as the beaten cellulose fibers.

Comparative Example 6

An alkaline battery separator having the weight per unit area of 38.8 g/m² and the thickness of 126 μm was obtained that was produced in the same manner as that of Example 1 except that the blending amount of the mercerized LBKP having the freeness, in terms of CSF, of 250 ml was varied to 55% by weight and the blending amount of the polyvinyl alcohol-based fibers was varied to 30% by weight.

Example 4

36% by weight of a substance formed by treating mercerized the LBKP using a refiner (the setting of clearance: 0.03 mm) to be adjusted to have the freeness, in terms of CSF, of 250 ml, 4% by weight of a substance formed by treating organic solvent-spun cellulose fibers ("Tencel" produced by Lenzing AG) of 1.7 dtex×3 mm to be adjusted to have the freeness, in terms of CSF, of 10 ml, 45% by weight of polyvinyl alcohol-based fibers of 0.3 dtex×3 mm (Vinylon, VN30300 produced by Kuraray Co., Ltd.), and 15% by weight of polyvinyl alcohol-based binder fibers of 1.1 dtex×3 mm (Vinylon Binder: VPB105-1×3 produced by Kuraray Co., Ltd.) were dispersed in water to produce slurry. Papermaking was conducted in accordance with two-layer combined papermaking using a paper machine. After drying using a Yankee dryer, the thickness was adjusted (the set weight per unit area: 39 g/m², the set thickness: 125 μm) between an elastic roll and a metal roll to obtain an alkaline battery separator having the weight per unit area of 38.7 g/m² and the thickness of 124 μm.

Example 5

An alkaline battery separator having the weight per unit area of 38.9 g/m² and the thickness of 123 μm was obtained that was produced in the same manner as that of Example 1 except that 32% by weight of a substance formed by treating the mercerized LBKP using a refiner (the setting of clearance: 0.03 mm) to be adjusted to have the freeness, in terms of CSF, of 250 ml and 8% by weight of a substance formed by treating organic solvent-spun cellulose fibers of 1.7 dtex×3 mm ("Tencel" produced by Lenzing AG) using a refiner to be adjusted to have the freeness, in terms of CSF, of 100 ml were used, as the beaten cellulose fibers.

Comparative Example 7

40% by weight of a substance formed by treating organic solvent-spun cellulose fibers of 1.7 dtex×3 mm ("Tencel" produced by Lenzing AG) using a refiner (the setting of clearance: 0.03 mm) to be adjusted to have the freeness, in terms of CSF, of 250 ml, 45% by weight of polyvinyl alcohol-based fibers of 0.3 dtex×3 mm (Vinylon, VN30300 produced by Kuraray Co., Ltd.), and 15% by weight of polyvinyl alcohol-based binder fibers of 1.1 dtex×3 mm (Vinylon Binder: VPB105-1×3 produced by Kuraray Co., Ltd.) were dispersed in water to produce slurry. Papermaking was conducted in accordance with two-layer combined papermaking using a paper machine. After drying using a Yankee dryer, the thickness was adjusted (the set weight per unit area: 39 g/m², the set thickness: 125 μm) between an elastic roll and a metal roll to obtain an alkaline battery separator having the weight per unit area of 39.0 g/m² and the thickness of 125 μm.

Example 6

An alkaline battery separator having the weight per unit area of 39.1 g/m² and the thickness of 125 μm was obtained in the same manner as that of Example 1 except that polyvinyl alcohol-based fibers of 0.5 dtex×3 mm (Vinylon, VPB053×3 produced by Kuraray Co., Ltd.) was used as the alkali-resistant fibers.

Example 7

An alkaline battery separator having the weight per unit area of 38.5 g/m² and the thickness of 126 μm was obtained in the same manner as that of Example 1 except that the blending amount of the polyvinyl alcohol-based fibers of 0.3 dtex×3 mm was varied to 40% by weight and 5% by weight of rayon fibers of 0.7 dtex×3 mm (Corona produced by Daiwabo Co., Ltd.) was used.

Example 8

An alkaline battery separator having the weight per unit area of 38.6 g/m² and the thickness of 128 μm was obtained in the same manner as that of Example 1 except that the blending amount of the polyvinyl alcohol-based fibers of 0.3 dtex×3 mm was varied to 30% by weight and 15% by weight of rayon fibers of 0.7 dtex×3 mm (Corona produced by Daiwabo Co., Ltd.) was used.

Example 9

An alkaline battery separator having the weight per unit area of 39.2 g/m² and the thickness of 124 μm was obtained in the same manner as that of Example 1 except that polyvinyl alcohol-based fibers of 1.1 dtex×3 mm (Vinylon, VPB103×3 produced by Kuraray Co., Ltd.) was used as the alkali-resistant fibers.

Comparative Example 8

An alkaline battery separator having the weight per unit area of 39.2 g/m² and the thickness of 125 μm was obtained in the same manner as that of Example 1 except that the blending amount of the polyvinyl alcohol-based fibers of 0.3 dtex×3 mm was varied to 35% by weight and 50% by weight of a substance formed by treating mercerized cotton linter using a refiner to be adjusted to have the freeness, in terms of CSF, of 150 ml was used.

TABLE 1

| | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|
| Alkali-Resistant Fibers Vinylon (0.3 dtex × 3 mm) (% by weight) | 45 | 55 | 45 | 45 | 45 | 65 | 20 | 45 | 30 |
| Beaten Cellulose Fibers (% by weight) Mercerized LBKP (CSF: 770 ml) | | | | | 40 | | | | |
| Mercerized LBKP (CSF: 580 ml) | | | | 40 | | | | | |
| Mercerized LBKP (CSF: 400 ml) | | | 40 | | | | | | |
| Mercerized LBKP (CSF: 250 ml) | 40 | 30 | | | | 20 | 65 | 40 | 55 |
| Mercerized LBKP (CSF: 140 ml) | | | | | | | | | |
| Binder Vinylon Binder (VPB 105-1) (% by weight) | 15 | 15 | 15 | 15 | 15 | 15 | 15 | 15 | 15 |
| Alkali-Resistant Fibers/Beaten Cellulose Fibers | 53/47 | 65/35 | 53/47 | 53/47 | 53/47 | 76/23 | 23/76 | 53/47 | 35/65 |
| Overall Freeness (CSF: ml) | 735 | 764 | 759 | 768 | 770 | 770 | 538 | 682 | 642 |
| Thickness after Papermaking (Before adjusting thickness) (μm) | 130 | 145 | 140 | 150 | 158 | 155 | 128 | 125 | 130 |
| Water Filtration Time Period (Value measured with ½ of weight per unit area of 39 g/m²) (sec) | 4.8 | 4.7 | 4.6 | 4.5 | 4.5 | 4.6 | 5.3 | 5.2 | 4.9 |
| Water Filtration Time Period (Value measured with weight per unit area of 39 g/m²) (sec) | 8.3 | — | — | — | 6.5 | — | 11.8 | — | 10.1 |
| Weight per Unit Area (g/m²) | 39.1 | 39.4 | 39.1 | 39.2 | 39.0 | 38.7 | 39.2 | 39.5 | 38.8 |
| Thickness (μm) | 127 | 124 | 125 | 126 | 124 | 125 | 126 | 127 | 126 |
| Density (g/m³) | 0.308 | 0.318 | 0.313 | 0.311 | 0.315 | 0.310 | 0.311 | 0.311 | 0.308 |
| Tensile strength (kg/15 mm) | 4.5 | 5.0 | 4.9 | 4.3 | 4.1 | 5.6 | 2.8 | 4.0 | 3.2 |
| Air Permeability (cc/cm²/sec) | 8.4 | 12.0 | 10.7 | 14.6 | 17.1 | 13.1 | 4.6 | 7.4 | 6.1 |
| Absorbent Property for Electrolyte Solutions (g/g) | 5.04 | 4.96 | 5.22 | 5.79 | 5.79 | 4.78 | 5.23 | 4.95 | 5.18 |
| Liquid Absorption Rate (sec/25 mm) | 128 | 96 | 105 | 77 | 67 | 76 | 349 | 148 | 220 |
| Degree of Swelling (%) | 29.8 | 28.4 | 35.4 | 41.6 | 46.1 | 24.1 | 40.8 | 29.6 | 39.2 |
| Ring Crush (Double) (g) | 380 | 460 | 330 | 390 | 350 | 460 | 180 | 330 | 290 |
| Alkali Elution Amount (%) | 206 | — | — | — | — | — | — | — | — |

TABLE 2

| | | Example 4 | Example 5 | Comparative Example 7 | Example 6 | Example 7 | Example 8 | Example 9 | Comparative Example 8 |
|---|---|---|---|---|---|---|---|---|---|
| Alkali-Resistant Fibers (% by weight) | Vinylon (0.3 dtex × 3 mm) | 45 | 45 | 45 | | 40 | 30 | | 35 |
| | Vinylon (0.5 dtex × 3 mm) | | | | 45 | | | | |
| | Vinylon (1.1 dtex × 3 mm) | | | | | | | 45 | |
| | Rayon (0.7 dtex × 3 mm) | | | | | 5 | 15 | | |
| Beaten Cellulose Fibers (% by weight) | Mercerized LBKP (CSF: 250 ml) | 36 | 32 | | 40 | 40 | 40 | 40 | |
| | Tencel (CSF: 250 ml) | | | 40 | | | | | |
| | Tencel (CSF: 100 ml) | | 8 | | | | | | |
| | Tencel (CSF: 10 ml) | 4 | | | | | | | |
| | Mercerized Cotton Linter (CSF: 150 ml) | | | | | | | | 50 |
| Binder (% by weight) | Vinylon Binder (VPB 105-1) | 15 | 15 | 15 | 15 | 15 | 15 | 15 | 15 |
| Alkali-Resistant Fibers/Beaten Cellulose Fibers | | 53/47 | 53/47 | 53/47 | 53/47 | 53/47 | 53/47 | 53/47 | 41/59 |
| Overall Freeness (CSF: ml) | | 726 | 725 | 688 | 755 | 732 | 737 | 742 | 610 |
| Thickness after Papermaking (Before adjusting thickness) (μm) | | 140 | 140 | 170 | 140 | 132 | 140 | 145 | 130 |
| Water Filtration Time Period (Value measured with ½ of weight per unit area of 39 g/m$^2$) (sec) | | 5.1 | 5.0 | 5.6 | 4.6 | 4.8 | 4.8 | 4.5 | 5.9 |
| Water Filtration Time Period (Value measured with weight per unit area of 39 g/m$^2$) (sec) | | — | — | 13.3 | — | — | — | — | — |
| Weight per Unit Area (g/m$^2$) | | 38.7 | 38.9 | 39.0 | 39.1 | 38.5 | 38.6 | 39.2 | 39.2 |
| Thickness (μm) | | 124 | 123 | 125 | 125 | 126 | 128 | 124 | 125 |
| Density (g/m$^3$) | | 0.312 | 0.316 | 0.312 | 0.313 | 0.306 | 0.302 | 0.316 | 0.314 |
| Tensile strength (kg/15 mm) | | 4.4 | 4.5 | 4.8 | 4.3 | 4.4 | 3.3 | 3.2 | 3.4 |
| Air Permeability (cc/cm$^2$/sec) | | 5.6 | 7.6 | 4.6 | 9.9 | 6.9 | 10.9 | 14.9 | 4.6 |
| Absorbent Property for Electrolyte Solutions (g/g) | | 4.81 | 5.06 | 5.65 | 4.84 | 5.08 | 5.36 | 4.76 | 4.72 |
| Liquid Absorption Rate (sec/25 mm) | | 157 | 145 | 186 | 157 | 125 | 159 | 153 | 192 |
| Degree of Swelling (%) | | 34.5 | 37.4 | 47.6 | 31.1 | 35.4 | 40.5 | 29.2 | 46 |
| Ring Crush (Double) (g) | | 460 | 360 | 360 | 310 | 410 | 310 | 350 | 300 |
| Alkali Elution Amount (%) | | 2.32 | 2.59 | 4.73 | — | — | — | — | — |

As is clear from Table 1, when the overall freeness was at least 700 ml, and the ratios of the alkali-resistant fibers and the beaten cellulose fibers were in the range of 28:72 to 72:28, and the beaten cellulose fibers of the mercerized natural wood fibers having a freeness of at least 150 ml and less than 550 ml were used, the degree of swelling of each of the obtained separators was able to be suppressed to be low and the separators excellent in the shielding property and the liquid retentivity were able to highly productively be obtained (Examples 1 to 3). On the other hand, when the freeness of the beaten cellulose fibers of the mercerized natural wood fibers was high, the degree of swelling was not able to be suppressed to be low and the shielding property was low (Comparative Examples 1 and 2). When the ratio of the alkali-resistant fibers to the beaten cellulose fibers was high, the shielding property was low (Comparative Example 3). When the ratio of the alkali-resistant fibers to the beaten cellulose fibers was low, the degree of swelling was high and the strength of the separator was low (Comparative Example 4).

As is clear from Tables 1 and 2, when the beaten cellulose fibers of the organic solvent-spun cellulose fibers were 10% by weight or lower, the obtained separators each presented high alkali resistance and it was confirmed that, especially, a smaller amount of the fibrillated substance of the organic solvent-spun cellulose fibers established more excellent alkali resistance (Examples 1, 4, and 5). On the other hand, when any mercerized natural wood fibers having the freeness, in terms of CSF, of at least 150 ml and less than 550 ml was not comprised as the beaten cellulose fibers and the beaten cellulose fibers of the organic solvent-spun cellulose fibers exceeded 10% by weight, the degree of swelling of the obtained separator was not able to be suppressed to be low and the alkali elution amount was large (Comparative Example 7). When the fineness of the alkali-resistant fibers was set to be high and when the regenerated cellulose fibers were comprised in addition to the alkali-resistant fibers, the thickness of the paper sheet after the papermaking was increased (Examples 6 to 9). Especially, when the fineness of the alkali-resistant fibers was in a range of 0.1 to 0.8 dtex, the thickness of the paper sheet after the papermaking was increased securing an excellent shielding property. When the mercerized cotton linter was used instead of the mercerized natural wood fibers as the beaten cellulose fibers, the degree of swelling was not able to be suppressed to be low and the papermaking property was low (Comparative Example 8).

When the overall freeness was lower than 700 ml, the water filtration time period with the weight per unit area of 39 g/m$^2$ and/or ½ thereof tended to be increased and the papermaking property tended to be degraded (Comparative Examples 4 to 7 and 8). These tendencies were also confirmed even when the ratios of the alkali-resistant fibers and the beaten cellulose fibers, and the freeness of the beaten cellulose fibers were each in the range defined in the present invention (Comparative Example 6). Especially, this tendency was conspicuous for the water filtration time period with the weight per unit area of 39 g/m² and this showed that the overall freeness functioned as a parameter representing the papermaking property at an actual papermaking step.

INDUSTRIAL APPLICABILITY

According to the present invention, the alkaline battery separator whose swelling in an alkaline electrolyte solution is sufficiently suppressed and that has various excellent properties such as a shielding property, an absorbent property for electrolyte solutions, and impact resistance as well as high alkali resistance can economically and highly productively be provided.

The invention claimed is:

1. An alkaline battery separator, comprising alkali-resistant fibers, beaten cellulose fibers and a binder, wherein:
   1) an overall freeness, in terms of CSF, is at least 700 ml and at most 765 ml;
   2) weight ratios of the alkali-resistant fibers and the beaten cellulose fibers are 28:72 to 72:28;
   3) the beaten cellulose fibers comprise mercerized natural wood fibers having a freeness, in terms of CSF, of at least 150 ml and less than 550 ml; and
   4) at least a portion of the alkali-resistant fibers is polyvinyl alcohol-based fibers.

2. The alkaline battery separator according to claim 1, wherein said polyvinyl alcohol-based fibers have an in-water dissolution temperature of at least 90° C.

3. The alkaline battery separator according to claim 1 wherein the binder is a polyvinyl alcohol-based binder.

4. The alkaline battery separator according to claim 1, wherein weight ratios of the alkali-resistant fibers, the beaten cellulose fibers, and the binder are 25 to 60:25 to 60:5 to 20.

5. The alkaline battery separator according to claim 1, wherein a freeness of the mercerized natural wood fibers is, in terms of CSF, at least 150 ml and less than 450 ml.

6. The alkaline battery separator according to claim 1, wherein a content of a fibrillated substance of organic solvent-spun cellulose fibers is 10% by weight or less based on the total weight of the alkaline battery separator.

7. The alkaline battery separator according to claim 1, further comprising regenerated cellulose fibers, wherein a content of the regenerated cellulose fibers is 25% by weight or less based on a total weight of the separator.

8. The alkaline battery separator according to claim 1, wherein a fineness of the alkali-resistant fibers is 0.1 to 0.8 dtex.

9. The alkaline battery separator according to claim 1, wherein air permeability of the alkaline battery separator is 13 cc/cm2/sec or lower.

10. The alkaline battery separator according to claim 1, wherein a degree of swelling of the alkaline battery separator in a 35%-KOH water solution at 25° C. is 41% or lower.

11. The alkaline battery separator according to claim 1, wherein an alkali elution amount of the alkaline battery separator in a 35%-KOH water solution at 60° C. is 3% or lower.

12. The alkaline battery separator according to claim 1, wherein:
   a weight per unit area of the alkaline battery separator is 20 to 50 g/m²; and
   a thickness of the alkaline battery separator is 70 to 150 µm.

13. An alkaline battery, comprising the alkaline battery separator according to claim 1.

14. The alkaline battery separator according to claim 1, wherein said polyvinyl alcohol-based fibers have an in-water dissolution temperature ranging from 90° C. to 200° C.

15. The alkaline battery separator according to claim 1, wherein said polyvinyl alcohol-based fibers have an in-water dissolution temperature ranging from 100° C. to 150° C.

16. The alkaline battery separator according to claim 1, wherein said polyvinyl alcohol-based fibers comprise a vinyl alcohol-based polymer which has an average polymerization degree of 1,000 to 5,000 and a saponification degree of 95% by mol or higher.

17. The alkaline battery separator according to claim 1, wherein said polyvinyl alcohol-based fibers comprise a vinyl alcohol-based polymer copolymerized with a distinct copolymer component wherein the copolymerization amount does not exceed 20% by mol.

18. The alkaline battery separator according to claim 1, wherein said polyvinyl alcohol-based fibers are acetalized.

* * * * *